United States Patent Office 3,558,628
Patented Jan. 26, 1971

3,558,628
CERTAIN 2,4-DIAMINO-6-QUINAZOLINE-
SULFONAMIDES
John Davoll, Shepperton, England, assignor to Parke,
Davis & Company, Detroit, Mich., a corporation of
Michigan
No Drawing. Filed Nov. 13, 1968, Ser. No. 775,504
Claims priority, application Great Britain, Dec. 8, 1967,
56,054/67
Int. Cl. C07d 51/48
U.S. Cl. 260—256.5          5 Claims

ABSTRACT OF THE DISCLOSURE 2,4-diamino-6-quinazolinesulfonamides and salts thereof, in which the sulfonamide nitrogen is optionally substituted by lower alkyl or benzyl, useful as pharmacological agents exhibiting anti-malarial activity, and their production by reacting 2,4-diaminoquinazoline-6-sulfonyl chloride or an acid-addition salt thereof with ammonia or a lower alkyl- or benzyl-substituted amine.

SUMMARY AND DETAILED DESCRIPTION

The present invention relates to new heterocyclic compounds that are useful pharmacological agents and to methods for their production. More particularly, the invention relates to new 2,4-diamino-6-quinazolinesulfonamide compounds having the formula

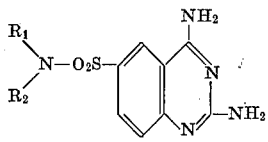

and to pharmaceutically-acceptable salts thereof; where $R_1$ is hydrogen, lower alkyl, or benzyl, and $R_2$ is hydrogen or lower alkyl. The lower alkyl radicals represented by $R_1$ and $R_2$ are those alkyl radicals having not more than four carbon atoms.

In accordance with the invention, compounds having the foregoing formula and salts thereof are produced by reacting 2,4-diaminoquinazoline-6-sulfonyl chloride or an acid-addition salt thereof with an amine compound having the formula

where $R_1$ and $R_2$ have the aforementioned significance. The 2,4-diaminoquinazoline-6-sulfonyl chloride reactant is preferably employed in acid-addition salt form, with the sulfate salt being particularly preferred because of its ease of preparation. At least two moles of the amine reactant are required for each mole of the 2,4-diaminoquinazoline-6-sulfonyl chloride, and, in the optimum case, a moderate to large excess of the amine reactant is preferred. The reaction is advantageously carried out in an unreactive solvent medium, which may conveniently be water, a lower alkanol, or a mixture of these two. The temperature of the reaction is not critical and may be varied over a wide range, from room temperature to about 150° C. A preferred temperature is the reflux temperature of the reaction mixture. At the preferred temperature the reaction is normally complete within 1–2 hours. The duration of the reaction also is not critical, however, and may be varied widely, from about 10–15 minutes to about 10–12 hours. Depending on the nature and amounts of reactants employed, the product of the reaction can desirably be isolated in free base or acid-addition salt form. In the preferred method of carrying out the reaction, 2,4-diaminoquinazoline-6-sulfonyl chloride sulfate is reacted with a large excess of the chosen amine compound, and the product is isolated as the free base, in some cases in hydrated form.

The 2,4-diaminoquinazoline-6-sulfonyl chloride starting material, in free base or acid-addition form, is readily prepared by reacting 2,4-diaminoquinazoline, in free base or acid-addition salt form, with chlorosulfonic acid. This starting material may, if desired, be prepared in situ and reacted further without isolation, or, preferably, where a large excess of chlorosulfonic acid has been used for its preparation, may be isolated briefly following aqueous decomposition of the excess chlorosulfonic acid. The 2,4-diaminoquinazoline-6-sulfonyl chloride isolated in this way is not stable for any extended period and is best used without delay in the subsequent reaction with an amine compound as described above. The preferred 2,4-diaminoquinazoline-6-sulfonyl chloride sulfate starting material is prepared by reacting 2,4-diaminoquinazoline sulfate with excess chlorosulfonic acid at a temperature of about 150° C., and then pouring the cooled reaction mixture onto ice to precipitate the desired solid starting material.

The free base compounds of the invention form pharmaceutically-acceptable acid-addition salts as indicated above or by reaction with any of a number of strong acids, such as hydrochloric, nitric, sulfuric, phosphoric, sulfonic, trichloroacetic, and benzenesulfonic acids. In addition, the compounds of the invention wherein either or both of $R_1$ and $R_2$ are hydrogen form pharmaceutically-acceptable alkali metal salts by reaction with an alkali metal base, such as sodium hydroxide, potassium hydroxide, sodium carbonate, and potassium carbonate. The acid-addition and alkali metal salts may differ from the parent compounds from which they are derived with respect to certain physical properties, such as solubility in polar solvents, but are otherwise equivalent for purposes of the invention.

The compounds of the invention are new chemical compounds that are useful as pharmacological agents, especially as antimalarial agents. Their antimalarial activity can be quantitatively determined by measuring their suppressive action against *Plasmodium berghei* infections in standard experimental animals.

In this test procedure, infections are induced in female CF-I mice weighing 20–24 grams each with trophozoites procured from donor mice during the ascending days of the parasitemia. An inoculum of 15 million *P. berghei* parasites per mouse is given intraperitoneally. Starting one day after the mice have been infected, a test compound is given either orally by gavage or subcutaneously twice daily for 4 days at various dose levels. Each dose is dissolved or suspended in sufficient water so that the amount of vehicle is 5 ml./kg. of body weight. On the fifth day following infection, blood smears are examined and the infection level is recorded in terms of the percentage of red blood cells parasitized. Mice that are sham-dosed with the vehicle alone are infected in parallel as controls. The suppressive activity of a test compound determined in this way is expressed as a quinine equivalent, which is defined as the ratio of the minimal effective dose of quinine to the minimal effective dose of the test compound. In this test, the minimal effective dose level of quinine has been found to be 50 mg./kg./day when given subcutaneously and 65 mg./kg./day when given orally.

When tested by the foregoing method, 2,4-diamino-N,N'-dimethyl-6-quinazolinesulfonamide, given subcutaneously, was found to have a quinine equivalent of 10, and 2,4-diamino-N-butyl-6-quinazolinesulfonamide, given by gavage, was found to have a quinine equivalent between 5 and 27.

As is apparent from the foregoing test description, the compounds of the invention can be administered either orally or parenterally. They can be combined with either a solid or liquid carrier or diluent and made available in varying amounts in such pharmaceutical forms as tablets, capsules, powders, and aqueous and non-aqueous suspensions and solutions.

The invention is illustrated by the following examples.

EXAMPLE 1

To a stirred suspension of 0.4 g. of sodium chloride in 12 ml. of chlorosulfonic acid, cooled in an ice bath, is added in portions 4.85 g. of 2,4-diaminoquinazoline sulfate, and the resulting mixture is heated for three hours at 150–160° C. Upon cooling, the reaction mixture is poured onto ice, and the solid 2,4-diaminoquinazoline-6-sulfonyl chloride sulfate that precipitates is isolated, washed with water, and dried. This intermediate solid product is then treated with 60 ml. of concentrated ammonium hydroxide, and the mixture is heated under reflux for one hour and then cooled to precipitate 2,4-diamino-6-quinazolinesulfonamide hemihydrate; M.P. 319° C., with decomposition, following crystallization from 50% aqueous ethanol.

A stirred suspension of 3.16 g. of 2,4-diamino-6-quinazolinesulfonamide hemihydrate in 5 ml. of water is treated dropwise with 2 N sodium hydroxide until a clear solution is obtained. To this solution is added 500 ml. of acetone to precipitate 2,4-diamino-6-quinazolinesulfonamide, sodium salt, trihydrate; M.P. 346–347° C., with decomposition.

EXAMPLE 2

A mixture consisting of 2,4-diaminoquinazoline-6-sulfonyl chloride sulfate (prepared from 3.52 g. of 2,4-diaminoquinazoline sulfate according to the procedure described in Example 1 above), 10 of n-butylamine, and 30 ml. of water is heated under reflux for one hour and is then evaporated to dryness to give 2,4-diamino-N-butyl-6-quinazolinesulfonamide; M.P. 238–239° C., following crystallization from a mixture of 50% aqueous ethanol and ammonia.

EXAMPLE 3

A mixture consisting of 2,4-diaminoquinazoline-6-sulfonyl chloride sulfate (prepared as in Example 1 above from 1.59 g. of 2,4-diaminoquinazoline sulfate), 7 ml. of benzylamine, and 20 ml. of ethanol is heated under reflux for one hour and is then evaporated to small volume. The residue is treated with water to precipitate 2,4-diamino-N-benzyl-6-quinazolinesulfonamide; M.P. 264–266° C., following crystallization from a mixture of 60% aqueous ethanol and ammonia.

EXAMPLE 4

A mixture consisting of 2,4-diaminoquinazoline-6-sulfonyl chloride sulfate (prepared as in Example 1 above from 13.85 g. of 2,4-diaminoquinazoline sulfate) and 180 ml. of 30% aqueous dimethylamine is heated under reflux for one hour. Upon cooling, there is obtained a solid precipitate of 2,4-diamino-N-N'-dimethyl-6-quinazolinesulfonamide, which is isolated, dried, and crystallized from 70% aqueous ethanol; M.P. 275–277° C.

The hydrochloride salt is obtained by treating a boiling solution of 0.3 g. of the above product in 35 ml. of 96% ethanol with 5 ml. of 2 N hydrochloric acid, cooling the resulting mixture, and isolating the crystalline solid 2,4 - diamino - N,N' - dimethyl-6-quinazolinesulfonamide hydrochloride that is obtained; M.P. 301° C., with decomposition.

EXAMPLE 5

A mixture consisting of 2,4-diaminoquinazoline-6-sulfonyl chloride sulfate (prepared as in Example 1 from 2.69 g. of 2,4-diaminoquinazoline sulfate), 15 ml. of N-methylbenzylamine, and 40 ml. of 50% aqueous ethanol is heated under reflux for one hour, allowed to cool, and then treated with 50 ml. of water to precipitate 2,4-diamino - N - benzyl - N - methyl-6-quinazolinesulfonamide, hemihydrate; M.P. 230–232° C., following crystallization from 60% aqueous ethanol.

EXAMPLE 6

A mixture consisting of 2,4-diaminoquinazoline-6-sulfonyl chloride sulfate (prepared as in Example 1 from 19.05 g. of 2,4-diaminoquinazoline sulfate), 50 ml. of diethylamine, and 70 ml. of water is heated under reflux for one hour. Upon cooling, there is obtained a precipitate of 2,4 - diamino - N,N-diethyl-6-quinazolinesulfonamide, which is isolated and crystallized from aqueous ethanol; M.P. 285° C.

Utilizing the foregoing procedure, the following 2,4-diamino-6-quinazolinesulfonamide compounds are obtained from the reactions indicated below.

(a) From the reaction of 2,4-diaminoquinazoline-6-sulfonyl chloride sulfate (prepared from 31.8 g. of 2,4-diaminoquinazoline sulfate) with 60 ml. of dipropylamine in 200 ml. of water, there is obtained 2,4-diamino-N,N-dipropyl-6-quinazolinesulfonamide monohydrate; decomposition point >300° C., following crystallization from 70% aqueous ethanol.

(b) From the reaction of dibutylamine (40 ml.) with 2,4-diaminoquinazoline-6-sulfonyl chloride sulfate in 130 ml. of water, there is obtained 2,4-diamino-N,N-dibutyl-6-quinazolinesulfonamide; M.P. 262–263° C.

I claim:

1. A member of the class consisting of 2,4-diamino-6-quinazolinesulfonamide compounds having the formula

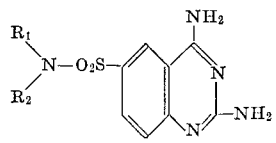

and pharmaceutically-acceptable salts thereof; where $R_1$ is a member of the class consisting of hydrogen, lower alkyl, and benzyl, and $R_2$ is a member of the class consisting of hydrogen and lower alkyl.

2. 2,4-diamino-N-butyl-6-quinazolinesulfonamide.
3. 2,4 - diamino - N,N - dimethyl-6-quinazolinesulfonamide.
4. 2,4-diamino-N,N-diethyl-6-quinazolinesulfonamide.
5. 2,4 - diamino - N - benzyl - N - methyl - 6 - quinazolinesulfonamide.

References Cited

UNITED STATES PATENTS 3,459,752   8/1969   Church et al. _____ 260—256.5

ALEX MAZEL, Primary Examiner

R. J. GALLAGHER, Assistant Examiner

U.S. Cl. X.R.

424—200, 251